United States Patent
Andersson (12) 
(10) Patent No.: US 8,863,687 B2
(45) Date of Patent: Oct. 21, 2014

(54) ROTARY PARLOUR FOR MILKING OF ANIMALS

(75) Inventor: Jan-Erik Andersson, Tumba (SE)

(73) Assignee: DeLaval Holding AB, Tumba (SE)

( * ) Notice: Subject to any disclaimer, the term of this patent is extended or adjusted under 35 U.S.C. 154(b) by 470 days.

(21) Appl. No.: 13/127,169

(22) PCT Filed: Oct. 28, 2009

(86) PCT No.: PCT/EP2009/064180
§ 371 (c)(1),
(2), (4) Date: May 2, 2011

(87) PCT Pub. No.: WO2010/052156
PCT Pub. Date: May 14, 2010

(65) Prior Publication Data
US 2011/0214612 A1 Sep. 8, 2011

(30) Foreign Application Priority Data

Nov. 7, 2008 (SE) ........................ 0802360

(51) Int. Cl.
*A01J 5/00* (2006.01)
*A01K 1/12* (2006.01)
*A01J 5/017* (2006.01)

(52) U.S. Cl.
CPC ............... *A01K 1/126* (2013.01); *A01J 5/0175* (2013.01)
USPC ....................... 119/14.04; 119/14.1

(58) Field of Classification Search
USPC ......................... 119/14.53, 14.03, 14.04, 14.1
See application file for complete search history.

(56) References Cited

U.S. PATENT DOCUMENTS

| 6,050,219 A | 4/2000 | van der Lely |
| 6,055,930 A | 5/2000 | Stein et al. |
| 6,450,118 B1* | 9/2002 | Eppers, Jr. ............... 119/14.53 |
| 2004/0050331 A1 | 3/2004 | Hein et al. |
| 2007/0022962 A1 | 2/2007 | Teckentrup et al. |

FOREIGN PATENT DOCUMENTS

| EP | 0349019 A2 | 1/1990 |
| EP | 1 169 914 A2 | 1/2002 |
| EP | 2 060 172 A | 5/2009 |
| RU | 2279796 C2 | 7/2006 |
| SU | 160627 A | 1/1964 |

(Continued)

OTHER PUBLICATIONS

Russian Office Action, dated Oct. 13, 2013, from corresponding RU.

(Continued)

*Primary Examiner* — Rob Swiatek
*Assistant Examiner* — Kathryn L Thompson
(74) *Attorney, Agent, or Firm* — Young & Thompson (57) ABSTRACT

A rotary parlour for milking of animals includes a rotary platform unit and storing devices connected to the platform unit and adapted to hold a number of teat cups in predetermined parking positions. The storing devices are supported by a supporting mechanism comprising an elevating part adapted to move the storing device between an operating position in which the storing device holds at least a part of the parked teat cups at a higher level than the lowest level of the upper surface of the platform unit and a non-operative position in which both the storing device and the parked teat cups are located at a lower level than the lowest level of the upper surface of the platform unit.

19 Claims, 4 Drawing Sheets

(56) References Cited

FOREIGN PATENT DOCUMENTS

| SU | 1777728 | A1 | 11/1992 |
|----|---------|----|---------|
| WO | 98/46069 | A1 | 10/1998 |
| WO | 0141560 | A1 | 6/2001 |
| WO | 2008/118068 | A1 | 10/2008 |

OTHER PUBLICATIONS

International Search Report, dated Feb. 8, 2010, from corresponding PCT application.
Supplementary International Search Report, dated Feb. 10, 2011, from corresponding PCT application.

* cited by examiner

ROTARY PARLOUR FOR MILKING OF ANIMALS

BACKGROUND OF THE INVENTION AND PRIOR ART

The present invention relates to a rotary parlour for milking of animals, wherein the parlour comprises a rotary platform unit having an upper surface adapted to support animals to be milked on the platform unit and at least one storing device connected to the platform unit and adapted to hold a number of teat cups in predetermined parking positions.

In a conventional rotary milking parlour, the cows walk on to an annular rotating platform and enter a milking stall via a gate arranged at a relatively narrow opening to the milking stall. When a cow has been positioned in a milking position in the milking stall, an operator or a milking robot grips teat cups in a storing device and attaches them to the teats of the cow. The teat cup storing device is usually mounted radially outside the platform in vicinity of the opening to a milking stall. It is easy for an operator or a milking robot to fetch the teat cups from a storing device in this position and attach them to the teats of a cow. The platform rotates continuously with a constant low speed. The milking operation of the cows is finished when the cows have been rotated nearly 360 degrees on the platform. A removing device removes the teat cups from the cows as soon as the milking operation has been finished. Rotary parlours have a high milking capacity due to the continuous flow of cows to the milking stalls.

A problem with the teat cup storing devices is that they may be in the way of the cows especially when they enter the platform and when they leave the platform. A cow is heavy and there is a risk that the storing devices and the teat cups will be deformed by a cow walking into the storing device or the teat cups when it enters or leaves the milking stall. There is also a risk that the cow gets injured.

US 2004/0050331 shows a rotary parlour for milking of animals. The parlour comprises a rotary platform having a plurality of milking stalls. The parlour comprises an entrance area from which the cows enter the platform and an exit area which the cows enter when they leave the platform. A milking unit comprising a claw and four teat cups is, via a detacher chain, connected to a retracting mechanism in each milking stall. A pivoting arm is adapted to guide the detacher chain and the milking unit between a milking position and a storage position. The pivoting arm is pivotally attached to a post in each milking stall. In the storage position, the pivoting arm is turned to a position in which it and the detacher chain do not block the opening to the milking stall. Furthermore, in the storing position, the detacher chain is drawn out such that it holds the milking unit at a level below the platform.

However, the milking unit hangs in the detacher chain and the teat cups are attached to the claw by flexible milking conduits. Thus, the teat cups are not parked in well defined positions in a storing device such that they can be gripped by a robot arm. Therefore, this construction is only applicable when an operator manually attaches the teat cups to the teats of a cow. In the storing position, the milking unit hangs in the detacher chain in a level below the level of the platform. Consequently, when the milking unit moves past the entrance area and the exit area, the detacher chain has to extend through a gap between the platform and the entrance area and the exit area. It is not without risk to have a chain hanging in this relatively narrow gap due to the relative motion between the platform and the entrance area and the exit area.

SUMMARY OF THE INVENTION

The object of the present invention is to provide a rotary parlour with a storing device which is able to hold a number of teat cups in predetermined parking positions such that it is easy to grip and attach the teat cups to the teats of an animal to be milked on the platform unit at the same time as the storing device and the teat cups are not in the way of the animals when the teat cups not are used.

This object is obtained, according to the invention, by the feature that the rotary parlour comprises elevating means adapted to move the storing device between an operating position in which it holds at least a part of the parked teat cups at a higher level than the lowest level of the upper surface of the platform unit and a non-operative position in which the storing device and the parked teat cups are located at a lower level than the lowest level of the upper surface of the platform unit. Normally, an annular platform unit has a plane upper surface sloping about 3° in relation to a horizontal plane. This simplifies the cleaning of the platform unit because water and dirt rinse off easily. The lowest level of the upper surface of the platform unit is located at an outer edge portion or at an inner edge portion of the platform unit. The elevating means makes it possible to move the supporting device and the parked teat cups to an operative position and a non-operative position. In the operative position, it is easy to grip the teat cups and move them to the teats of an animal since the teat cup at least partly is held in a position above the upper surface of the platform unit. In the non-operative position, both the teat cups and the storing device are located at a lover level than the level of the upper surface of the platform unit. In this position, the teat cups and the storing device are not in the way of the animals on the platform unit. According to a preferred embodiment of the invention, the rotary parlour comprises an entry area arranged at an outer edge portion of the platform unit from which the animals enter the platform unit and an exit area arranged at the outer edge portion of the platform unit which the animals enter when they leave the platform unit. The entry area and the exit area are normally arranged in the vicinity of each other at the outer edge portion of the platform unit. Preferably, the entry area and/or the exit area are formed by an element provided with a lower surface located at a level above a ground surface. In this case, a space is formed between the lower surface of element and the ground surface. Advantageously, the storing device and the parked teat cups are, in the non operative position, located at a lower level than the level of the lower surface of the element forming the entry area or the exit area. In this case, it is possible for the storing device and the parked teat cup to be moved into the space under the element forming the exit area and/or the enter area. The storing device and the parked teat cup are in this space absolutely not in the way of the animals when they enter and leave the platform unit. The storing device and the parked teat cup may be moved to the non-operative position in good time before the storing device arrives to the exit area and the entry area.

According to another preferred embodiment of the invention, the rotary parlour comprises a support element connected to the storing device by means of a movable connection. In this case, the storing device may perform a motion in relation to the fixed support element. Such a connection may be a pivot connection, a slidable connection or a suitable link connection. The support element may have a fixed connection to a lower surface of the platform unit. The support element may be fixedly connected to the underside of the platform unit by means of welding, bolts or the like. Preferably, the whole support element is mounted in a position below the lowest level of the upper surface of the platform unit. Thereby, there is no risk that the support element will be in the way of the animals on the platform unit. The support element may be fixedly connected to the underside of the platform unit at one end portion and movably connected to storing device at an opposite end portion. Such a support element may for example be U-shaped or L-shaped.

According to another preferred embodiment of the invention, the elevating means may be adapted to move the storing device between the operative position and the non-operative position. The elevating means may be a suitable power member which moves the storing device to the operative position when the teat cups are to be used and to the non-operative position when the teat cups are not to be used. The power member may be an extensible cylinder such as a hydraulic, pneumatic electric cylinder or a rotary motor. Alternatively, the elevating means may comprise a ramp with a guiding surface arranged on the ground surface cooperating with guided members attached to the storing device such as one or several rolling members which follow the guiding surface. Preferably, the elevating means moves the storing device to the operative position just before the teat cups are to be attached to an animal and moves the storing device to the non-operative position as soon as the teat cups have been removed from the teats of an animal.

According to another preferred embodiment of the invention, the rotary parlour comprises a milking robot adapted to grip and move the teats cups from their predetermined positions in the storing device and attach them to the teats of an animal standing in a milking position on the platform unit. Since the teat cups are held in predetermined parking positions in the storing device, it is easy for a milking robot to grip the teat cups. The milking robot may grip one or several teat cups at a time. However, it is also possible to grip and attach the teat cups manually.

According to another preferred embodiment of the invention, the rotary parlour comprises positioning means adapted to arrange the animals in milking positions on the platform unit such that the rear legs of the animals are positioned in the vicinity of an outer edge portion of the platform unit. The positioning means may be fence arrangements dividing the platform unit into milking stalls for receiving individual cows. The positioning means may arrange the animals such that the longitudinal axes of the animals are inclined somewhat to a radial plane on the platform unit. In this case, the animals are arranged in a so called herringbone pattern. Alternatively, the positioning means may arrange the animals in milking positions such that the longitudinal axes of the animals extend in a radial plane on the platform unit. The storing device may be arranged in a substantially radially outwardly position of the rear legs of an animal standing in a milking position on the platform unit. In this case, the teat cups may be moved from the storing device to the teats of an animal via the space between the rear legs of the animal. It is here possible to arrange the storing device very close to an animal standing on the platform unit in a milking position. Consequently, the milk conduits and the pulsation conduits, which are connected to the teat cups, can be made short. The risk that the conduits get entangled with each other thereby becomes small. Furthermore, the distance that the teat cups are moved in contact with the ground, during the removing process of the teat cups, can be made very small. This decreases the risk that the teat cups will become dirty during the removing process. Furthermore, the risk that the teat cups will damage the legs of the animals is also reduced. The whole storing device may be arranged in a position radially outwardly of the outer edge portion of the platform unit both in the operative position and in the non-operative. In this case, the storing device may be moved between said positions in a relatively simple manner.

According to a preferred embodiment of the invention, the rotary parlour comprises a removing device adapted to remove at least one teat cup from a teat of an animal when a milking operation of the animal has been finished and to move the teat cup to a predetermined parking position in the storing device. Preferably each teat cup is connected to a milk conduit and a pulsation conduit, wherein the removing device is adapted to provide a pulling force in the milk conduit and/or in the pulsation conduit when it removes a teat cup from a teat of an animal. Preferably, the removing device is arranged at a lower level than the level of the level of the upper surface of the platform unit. Thereby, the removing device will not be in the way of the animals on the platform unit. Since both the removing device and the teat cups in the non-operative position are arranged at a lower level than the upper surface of the platform unit, it is also possible to arrange the milking conduit and the pulsation conduit at such a low level. In this case, all components associated with the storing device and the parked teat cups will be located at such a low level that they not are in the way of the animals on the platform unit.

BRIEF DESCRIPTION OF THE DRAWINGS

In the following, preferred embodiments of the invention are described by examples and with references to the attached drawings, in which.

BRIEF DESCRIPTION OF PREFERRED EMBODIMENTS OF THE INVENTION

Figure 1:
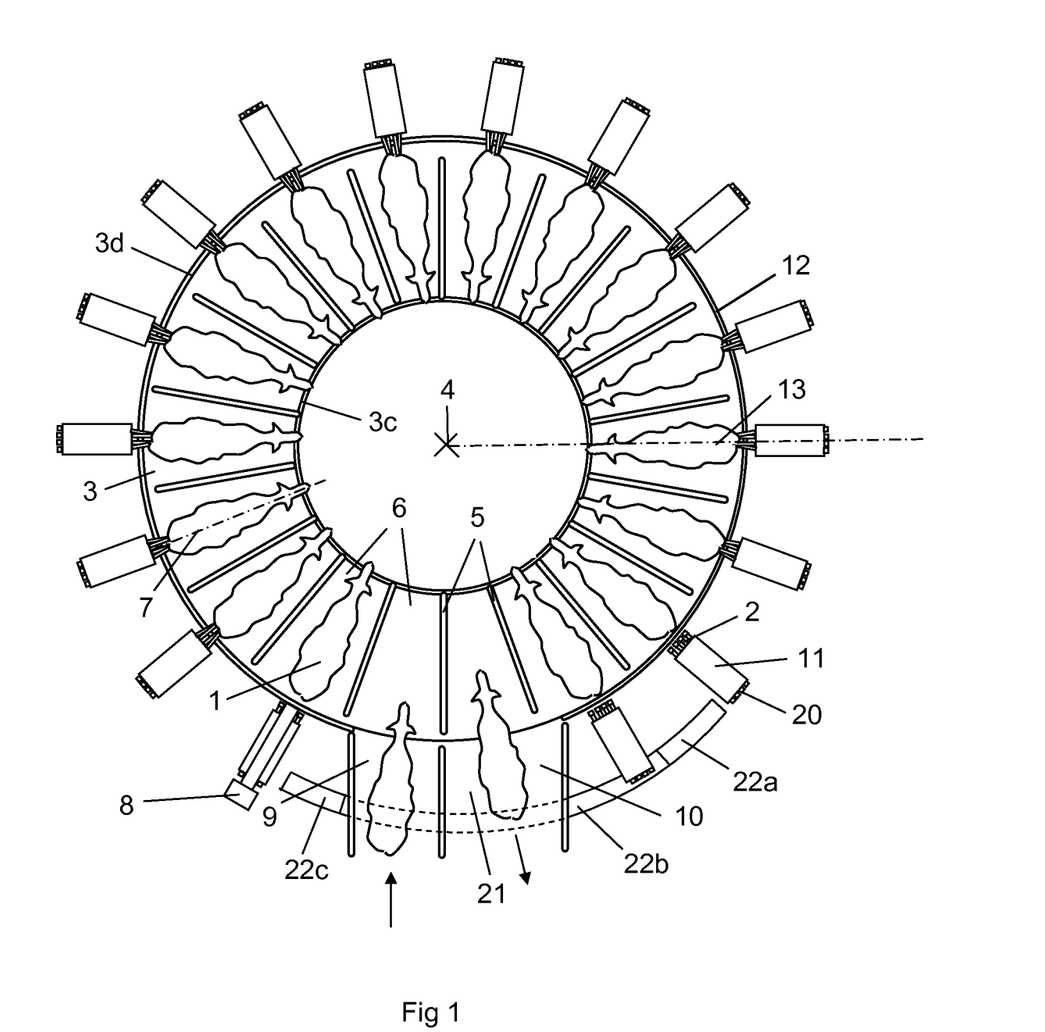
FIG. 1 shows a rotary parlour for milking of cows.

FIG. 1 shows a rotary parlour for milking of cows 1. The parlour comprises an annular platform unit 3 which is rotatably arranged around a substantially vertical axis 4. The annular platform unit 3 has an inner edge portion 3c and an outer edge portion 3d. A plurality of fence arrangements 5 are mounted on the platform unit 3. The fence arrangements 5 extend in a substantially radial direction on the annular platform unit 3. The fence arrangements 5 divide the platform unit 3 into milking stalls 6 for receiving individual cows 1. The fence arrangements 5 form milking stalls 6 in which the cows 1 stand in milking positions with their longitudinal axes 7 in a radial direction on the annular platform unit 3. The rear legs of the cows 1 are located at in the vicinity of the inner edge portion 3c of the platform unit 3. A milking robot 8 is adapted to attach teat cups 2 to the cows 1 in the milking stalls 6. The milking robot 8 works from a position radially outside of the annular platform unit 3. The cows 1 enter the milking stalls 6 from an entry area 9 located at the outer edge portion 3d of the platform unit 3. The cows 1 rotate nearly 360° on the platform unit 3. The cows 1 then leave the milking stall 6 and the platform unit 3 after being milked and possibly fed on the platform unit 3 via an exit area 10. The exit area 10 is located at the outer edge portion 3d of the platform unit 3 adjacent to the entry area 9. A bar arrangement 12 has an extension above the outer edge portion 3d of the platform unit 3 except at the entry area 9 and the exit area 10. The bar arrangement 12 is adapted to prevent the cows 1 in the milking stalls 6 from stepping backwards and out of the platform unit 3. Each milking stall 6 comprises a storing device 11 for parking of teat cups 2. The milking stalls 6 are divided in two halves by a radial centre plane 13. The storing devices 11 are mounted radially outside a centre part of the respective milking stalls 6 such that the radial centre plane 13 extends through the storing devices 11.

Figure 2:
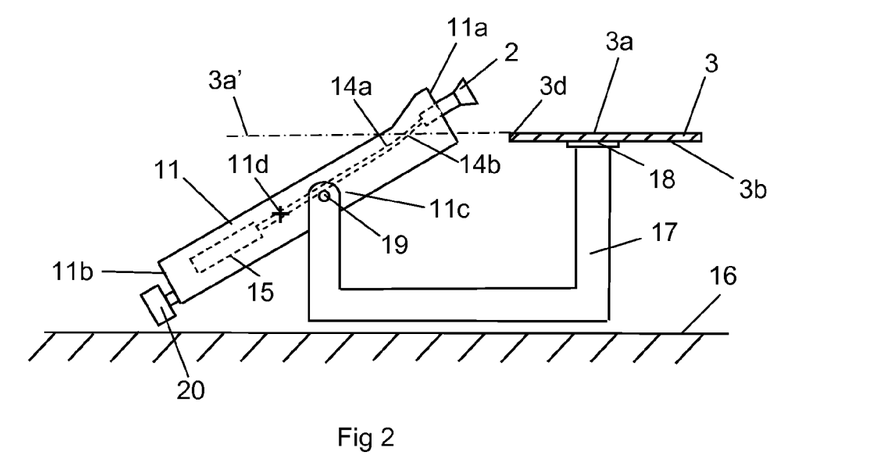
FIG. 2 shows a view of a storing device according to the invention in an operative position.

FIG. 2 shows one of the storing devices 11 more in detail. In this case, the storing device has a cabinet like construction. The storing device 11 has a design with specific parking positions for four teat cups 2. The parking positions are here located in a row at a first end portion 11a of the storing device 11. However, only one teat cup 2 is visible in FIG. 2. Each teat cup 2 is provided with a milk conduit 14a and a pulsation conduit 14b. A removing device 15 is arranged inside the cabinet like construction of the storing device 11. In this case, the removing device comprises one removing cylinder 15 for each teat cup 2. However, the removing device 15 may comprise an actuator of an arbitrary kind such as a rotary motor. One of the removing cylinders 15 is schematically shown in FIG. 2. The removing cylinders 15 are adapted to provide a pulling force in the milk conduits 14a and/or the pulsation conduits 14b of the respective teat cups 2, when a milking operation has been finished. As a result, the teat cups 2 are removed from the teats of the cows 1 and retracted to the parking positions in the storing device 11. The storing devices 11 comprise a second end portion 11b located at an opposite end to the first end portion 11a. A number of rolling members 20 are mounted in a row at the second end portion 11b.

The platform unit 3 has an upper surface 3a adapted to support the cows 1 in the milking stalls 6 and a lower surface 3b forming an underside of the platform unit 3. The platform unit 3 is rotatably arranged by a conventional drive mechanism at a level above a ground surface 16. The platform unit 3 has a plane upper surface 3a sloping about 3° in relation to a horizontal plane in order to simplify the cleaning of the platform unit. In this case, the lowest level of the upper surface 3a of the platform unit is located at the outer edge portion 3d of the platform unit. The upper surface of the platform unit 3a is at the outer edge portion 3d located at a level 3a' above the ground surface 16. The storing device 11 is supported by a substantially U-shaped supporting member 17. One end of the supporting member 17 is fixedly connected to the lower surface 3b of the platform unit 3 by means of a suitable fixed connection 18. The fixed connection 18 may for example comprise a weld joint or a bolt connection. The opposite end of the supporting member 17 supports the storing device 11 by means of a pivot joint 19. The pivot joint 19 is arranged in a middle portion 11c of the storing device 11 located between the first end portion 11a and the second end portion 11b. In this case, the storing device 11 has the centre of mass 11d located at a distance from the pivot joint 19. The centre of mass 11d is here located between the pivot joint 19 and the second end portion 11b of the storing device 11. Due to this fact, the storing device 11 is adapted to turn around the pivot joint 19 to an inclined position which is shown in FIG. 2. In this inclined position, the storing device 11 is in an operative position. In the operative position, at least a part of the parked teat cups 2 are located at a higher level than the level 3a' of the upper surface 3a at the outer edge portion 3d of the platform unit 3. When the storing device 11 is in the operative position, it is easy for the milking robot 8 to grip the teat cups 2 and attach them to a cow 1 standing in a milking stall 6 on the platform unit 3. In the operative position, the rolling members 20 of the storing device are in contact with the ground surface 16 or located just above it.

Figure 3:
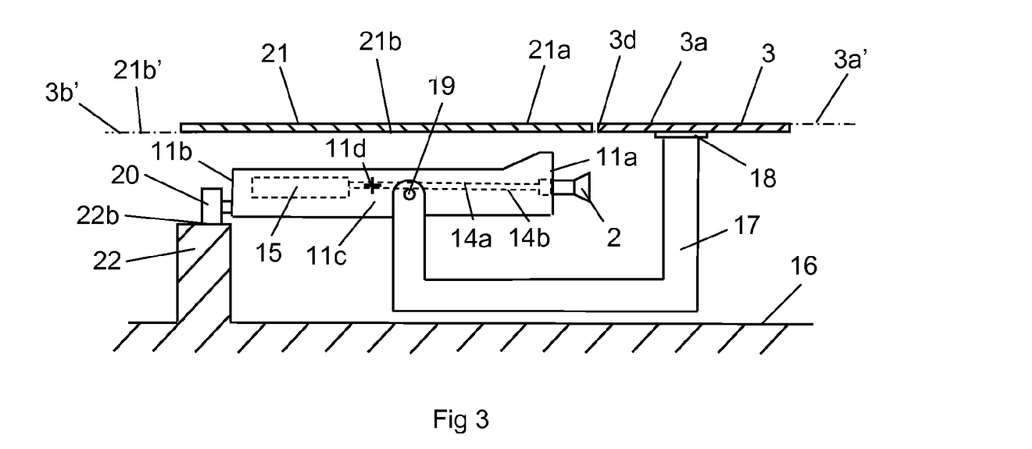
FIG. 3 shows a view of the storing device in FIG. 2 in a non-operative position.

A plate shaped element 21 forms the entry area 9 and the exit area 10. Alternatively, separate plate shaped elements may be used for forming the entry area 9 and the exit area 10. A ramp 22 is formed on the ground surface 16 radially outside of the platform unit 3. The ramp 22 is arranged at a radial distance from the platform unit 3 such that the rolling members 20 of the storing devices 11 come in contact with an upper guide surface of the ramp 22 during rotation of the platform unit 3. The ramp 22 comprises a first portion with an upwardly inclined guide surface 22a, a second portion with a plane guide surface 22b and a third portion with a downwardly inclined guide surface 22c. FIG. 3 shows the storing device 11 when the rolling members 20 are in contact with the plane guide surface 22b of the ramp. The contact between the rolling members 20 and the guide surface 22b of the ramp 22 has in FIG. 3 turned the storing device 11 around the pivot joint 19 to a non-operative position in which the first end portion 11a and the second end portion 11b of the storing device 11 are located at substantially the same level. In this non-operative position, the whole storing device 11 and the parked teat cups 2 are arranged at a lower level than the level 21b' of the lower surface 21b of the plate shaped element 21 forming the entry area 9 and the exit area 10. Consequently, the storing devices 11 and the parked teat cups 2 are in the non-operative position able to pass under the plate shaped element 21 forming the entry area 9 and the exit area 10 to the platform unit 3.

When cows 1 are to be milked, they walk to the entry area 9. The entry area 9 has a width such that only one cow 1 at a time can be located in a first position of the entry area 9. When a vacant milking stall 6 arrives to a position in front of the entry area 9, the cow 1 enters the milking stall 6 and places herself in a milking position on the platform unit 3. In the milking position, the rear legs of the cow 1 will be located in the vicinity of the outer edge portion 3d of the platform unit 3. The milking robot 8 is placed in the vicinity of the entry area 9. The milking robot 8 is activated as soon as the milking stall 6 with the cow 1 has been rotated a small angle from the entry position to a teat cup attaching position located substantially in front of the milking robot 8. Since there is no ramp 22 here, the storing device 11 is in the operative position. In this position, the storing device 11 holds the teat cups 2 above the level 3a' of the upper surface 3a at the outer edge portion 3d of the platform unit 3. It is easy for the milking robot 8 to grip the teat cups 2 and move them to the teats of the cow 1 standing in the milking stall 6. In this case, the milking robot 8 moves the teat cups 2 to the teats via the passage between the rear legs of the cow 1.

As soon as the milking robot 8 has attached the teat cups 2 to the teats of the cow 1, the milking operation of the cow 1 starts. The milking operation of the cow 1 continues during nearly one revolution of rotation of the platform unit 3. As soon as the milk flow from the cow 1 drops below a predetermined value, the removing cylinders 15 are activated and the teat cups 2 are individually removed from the teats of the cowl. The rolling members 20 of the storing device 11 reach the first portion of the ramp 22 just when the teat cups 2 have been removed from the cow 1. The contact between the rolling members 20 and the upwardly inclined guide surface 22a of the first portion of the ramp 22 turns the storing device 11 around the pivot joint 19. When the rolling members 20 reach the second portion of the ramp 22, the first end portion 11a of the storing device 11 has been turned down to substantially the same level as the second end portion 11b. The storing device is now in the non-operative position.

The rolling members 20 of the storing device 11 reach the second portion of the ramp 22 in good time before milking stall 6 reaches the exit area 10. In the non-operative position, the whole storing device 11 and the parked teat cups 2 are located at a lower level than the level 21b' of the lower surface 21b of the plate-shaped element 21 forming the entry area 9 and the exit area 10. Thereby, the storing device 11 and the parked teat cups 2 are able to pass through the space located under the exit area 10 and the entry area 9 during the continuous rotation of the platform unit 3. Consequently, when the milking stall 6 reaches the exit area 10, the cow 1 can leave the milking stall 6 and enter the exit area 10 without risk to come in contact with the storing device 11, the teat cups 2 and their associated conduits 14a, 14b. In a similar manner, a new cow 1 does not risk to come in contact with the storing device 11, the teat cups 2 and their connected conduits 14a, 14b during its motion from the entry area 9 to a milking stall 6. Also the retracting cylinders 15 and the support element 17 are arranged in positions such that they are able to pass under the plate-shaped element 21. In this case, the storing device 11 is moved to the non-operative position by means of the gravity force. Alternatively, a suitable spring member may be used for this purpose.

Figure 4:
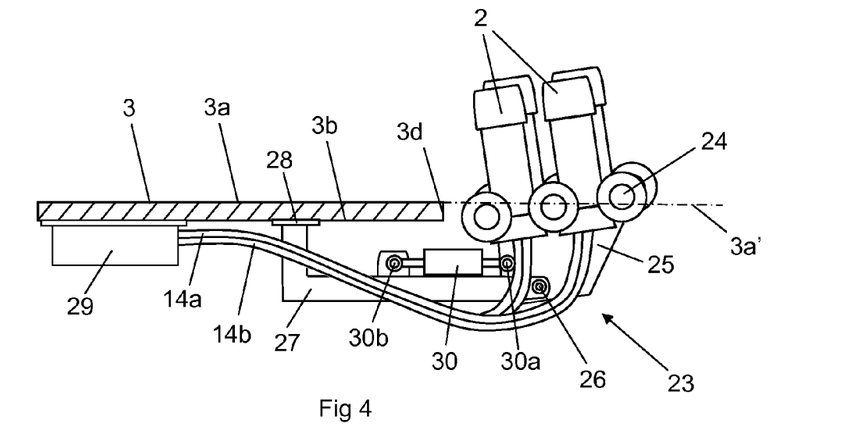
FIG. 4 shows a view of a second embodiment of a storing device in an operative position.
Figure 5:
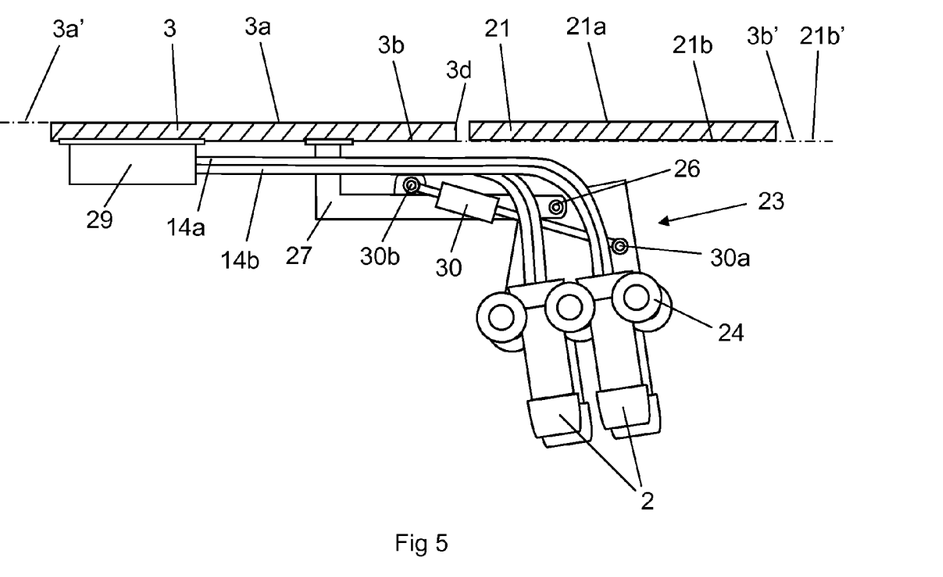
FIG. 5 shows a view of the storing device in FIG. 4 in a non-operative position.

FIGS. 4 and 5 show an alternative embodiment of the teat cup storing device 23. In this case, the teat cup storing device 23 comprises a number of rollers 24 arranged in a manner such that they support four teat cups 2 in parked positions. The rollers 24 are rotatably mounted on a plate member 25. The plate member 25 is, via a pivot 26, connected to an outer end portion of an L-shaped support element 27. An inner end of the L-shaped support element 27 is fixedly connected to the lower surface 3b of the platform unit 3 via a suitable fixed connection 28. Each teat cup 2 is provided with a milk conduit 14a and a pulsation conduit 14b. A schematically disclosed removing device 29 is connected to the milk conduit 14a and/or the pulsation conduit 14b at a distance from the teat cups 2. An extensible power cylinder 30 is connected to the plate member 25 via a connection 30a and to the L-shaped support element 27 via a connection 30b. The extensible power cylinder 30 may be exchanged by an actuator of an arbitrary kind such as a rotary motor.

When the teat cup 2 is to be used, the power cylinder 30 is contracted. Thereby, the cylinder 30 turns the plate member 25 with the connected rollers 24 and teat cups 2 in relation to the L-shaped support element 27 around the pivot 26 to the position shown in FIG. 4. In this operative position, a main part of the teat cups 2 is held in a position above the level 3a' of the upper surface 3a of the outer edge portion of the platform unit 3. It is here easy for the milking robot 8 to grip the teat cups 2 and move them to the teats of a cow 1 standing in a milking stall 6. When the milking operation of the cow 1 is finished, the removing device 29 is activated. The removing device 29 provides a pulling force in the milk conduit 14a and/or the pulsation conduit 14b such that the teat cups 2 are removed from the teats of the cow 1 and retracted to the parking positions defined by the rollers 24. As soon as the teat cups have been parked in the storing device 23, the power cylinder 30 is extended. Alternatively, a suitable spring member is used for this motion. The cylinder 30 turns the plate member 25 with the connected rollers 24 and teat cups 2 in relation to the L-shaped support element 27 around the pivot 26 to the position shown in FIG. 5. In this non-operative position, the whole storing device 23 and the teat cups 2 are held in a position below the level 21b' of the lower surface 21b of the plate shaped element 21. Thereby, the storing device 23 and the parked teat cups 2 are able to pass through the space located under the plate-shaped element 21. In this case, the level 21b' of the lower surface 21b of the plate shaped element 21 corresponds to the level 3b' of the lower surface of the platform unit 3 in the vicinity of the outer edge portion of the platform unit 3.

Figure 6:
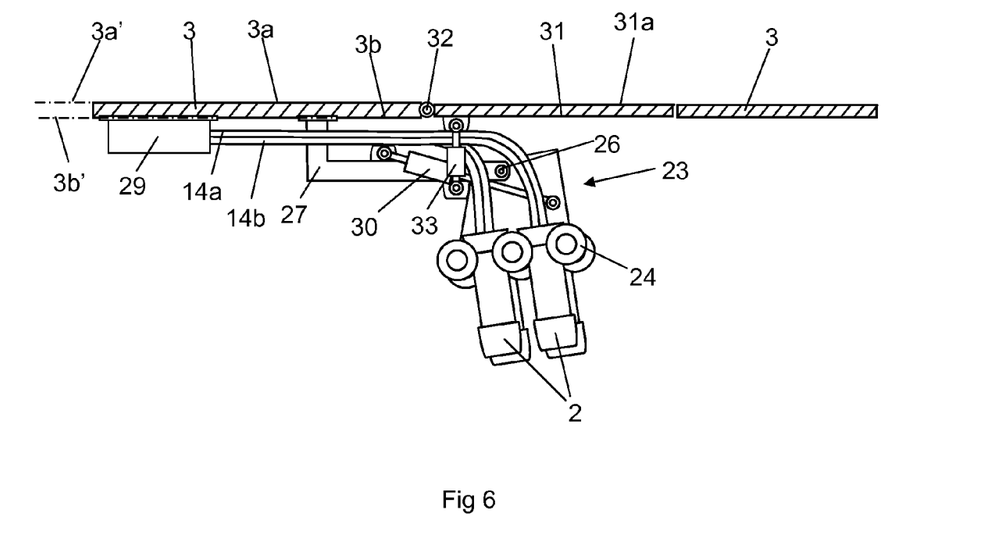
FIG. 6 shows a view of a third embodiment of a storing device in a non-operative position and FIG. 7 shows a view of the storing device in FIG. 6 in an operative position.
Figure 7:
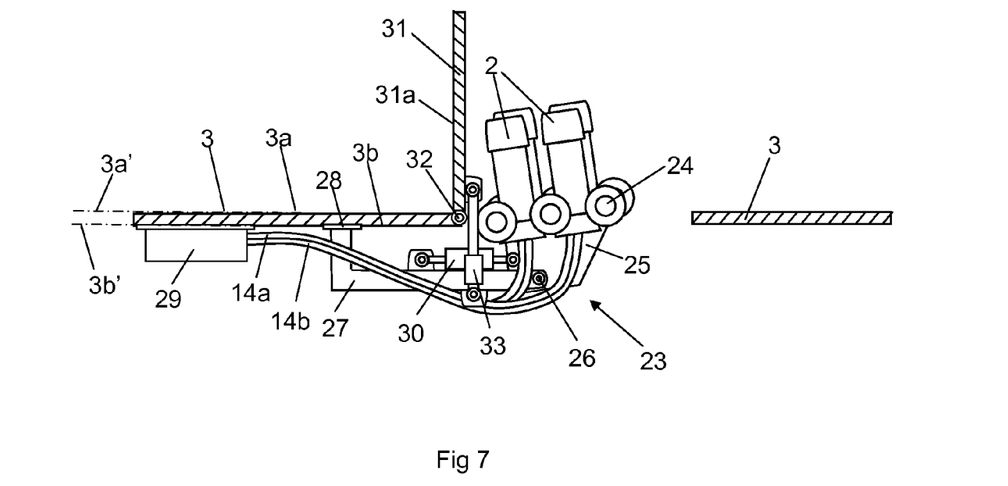

FIGS. 6 and 7 show a further alternative embodiment of the teat cup storing device 23. The teat cup storing device 23 has here a substantially similar design as the embodiment shown in FIGS. 4 and 5. However, the platform unit 3 comprises in this case an openable hatch 31. The hatch 31 is pivotally mounted by means of a hinge mechanism 32 between a closed position in which an upper surface 31a of the hatch 31 forms an upper surface 3a of the platform unit 3 and an open position in which it uncovers an opening in the platform unit 3. The teat cup storing device 23 comprises an additional power cylinder 33 adapted to move the hatch 31 between the closed position and the open position.

When the teat cup 2 is to be used, the additional power cylinder 33 is activated such that it moves the hatch 31 from the closed position to the open position such that the opening in the platform unit 3 is uncovered. Thereafter, the power cylinder 30 turns the plate member 25 with the connected rollers 24 and teat cups 2 in relation to the L-shaped support element 27 around the pivot 26 to the position shown in FIG. 7. During this motion, the teat cups 2 are moved upwardly through the opening to an operative position, in which at least a main part of the teat cups 2 is located above the level 3a' of the upper surface 3a of the platform unit 3. It is here easy for the milking robot 8 to grip the teat cups 2 and move them to the teats of a cow 1 standing in a milking stall 6. When the milking operation of the cow 1 is finished, the removing device 29 is activated. The removing device 29 provides a pulling force in the milk conduit 14a and/or the pulsation conduit 14b such that the teat cups 2 are removed from the teats of the cow 1 and retracted to the parking positions defined by the rollers 24. As soon as the teat cups have been parked in the storing device 23, the power cylinder 30 is extended such it turns the plate member 25 with the connected rollers 24 and teat cups 2 in relation to the L-shaped support element 27 around the pivot 26 to the position shown in FIG. 6. In this non-operative position, the whole storing device 23 and the teat cups 2 are positioned below the level 3b' of the lower surface 3 of the platform unit 3. Finally, the additional power cylinder 33 is activated such that it moves the hatch 31 from the open position to the closed position. The hatch 31 may be arranged in the platform unit 3 in a position substantially below the teats of an animal in a milking stall.

The invention is not limited to the described embodiments but may be varied and modified freely within the scope of the claims.

The invention claimed is:

1. A rotary parlour for milking of animals (1), comprising:
a rotary platform unit (3) having i) an upper surface (3a) adapted to support animals (1) to be milked on the platform unit, and ii) a lower surface (3b) forming an underside of the platform unit;
at least one storing device (11, 24, 25) for parking of teat cups (2) in predetermined parking positions;
a supporting member (17, 27) located below the lower surface of the platform unit and supporting the storing device, the supporting member (17, 27) being mounted to the lower surface (3b) of the platform unit by a fixed connection (18, 28) between the lower surface (3b) of the platform unit (3) and an upper portion of the supporting member (17, 27), the at least one storage device (11, 24, 25) being fixedly connected to the lower surface (3b) of the platform unit (3) via the supporting member (17, 27); and an elevating part (20, 22, 30) arranged to move the storing device between an operating position and a non-operative position, in the operating position, the storing device holding at least a part of the teat cups at a higher level than a lowest level (3a') of an adjacent portion of the upper surface (3a) of the platform unit, in the non-operative position, the storing device storing the teat cups at a lower level than the lowest level (3a') of the adjacent portion of the upper surface (3a) of the platform unit (3), in the non-operative position, the storing device being located below the lowest level (3a') of the adjacent portion of the upper surface (3a) of the platform unit (3).

2. The rotary parlour of claim 1, further comprising:
an entry area (9) at an outer edge portion of the platform unit (3) from which the animals enter the platform unit (3); and
an exit area (10) at the outer edge portion of the platform unit (3) from which the animals enter when they leave the platform unit (3),
wherein at least one of i) the entry area (9) and ii) the exit area (10) is formed of an element (21) provided with a lower surface (21b) located at a level (21b') above a ground surface (16).

3. The rotary parlour of claim 2, wherein,
in the non operative position, the storing device (11) and the teat cups (2) are, located at a lower level than the level (21a') of the lower surface (21b) of the element (21) forming the at least one of i) the entry area (9) and ii) the exit area (10).

4. The rotary parlour of claim 1, further comprising:
a positioning means (5) adapted to arrange the animals (1) in milking positions on the platform unit (3) such that the rear legs of the animals (1) are positioned in the vicinity of an outer edge portion (3d) of the platform unit.

5. The rotary parlour of claim 4, wherein said positioning means (5) is adapted to arrange the animals (1) in milking positions such that the longitudinal axes (7) of the animals (1) extends in a radial plane on the platform unit (3).

6. The rotary parlour of claim 1, further comprising:
a milking robot (8) adapted to grip and move the teat cups from the predetermined positions in the storing device (11, 24, 25) and attach the teat cups to the teats of an animal standing on the platform unit (3).

7. The rotary parlour of claim 1, wherein,
the storing device (11, 24, 25) is arranged in a substantially radially outwardly position of the rear legs of an animal (1) standing in a milking position on the platform unit (3).

8. The rotary parlour of claim 1, wherein,
the storing device (11, 24, 25) is, in the operative position, arranged in a position radially outwardly of the outer edge portion (3d) of the platform unit and below the lowest level (3a') of the adjacent portion of the upper surface (3a) of the platform unit (3).

9. The rotary parlour of claim 1, wherein,
the whole storing device (11, 24, 25) is, in the non-operative position, arranged in a position radially outwardly of the outer edge portion (3d) of the platform unit.

10. The rotary parlour of claim 1, wherein,
the storing device comprises a removing device (15, 29) connected to remove at least one teat cup (2) from a teat of an animal (1) when a milking operation of the animal (1) has been finished and to move the teat cup to one of the predetermined parking positions in the storing device.

11. The rotary parlour of claim 10, wherein,
each teat cup (2) is connected to a milk conduit (14a) and a pulsation conduit (14b), and
the removing device (15, 29) provides a pulling force in at least one of i) the milk conduit (14a) and ii) the pulsation conduit (14b) when the removing device removes a teat cup from a teat of an animal (1).

12. The rotary parlour of claim 10, wherein the removing device (15, 29) is arranged at a lower level than the lowest level (3a') of the upper surface (3a) of the platform unit (3).

13. A rotary parlour for milking of animals (1), comprising:
a rotary platform unit (3) having i) an upper surface (3a) adapted to support animals (1) to be milked on the platform unit, and ii) a lower surface (3b) forming an underside of the platform unit;
at least one storing device (11, 24, 25) for parking of teat cups (2) in predetermined parking positions;
a supporting member (17, 27) located below the lower surface of the platform unit and supporting the storing device; and
an elevating part (20, 22, 30) arranged to move the storing device between an operating position and a non-operative position,
in the operating position, the storing device holding at least a part of the teat cups at a higher level than a lowest level (3a') of an adjacent portion of the upper surface (3a) of the platform unit,
in the non-operative position, the storing device storing the teat cups at a lower level than the lowest level (3a') of the adjacent portion of the upper surface (3a) of the platform unit (3),
in the non-operative position, the storing device being located below the lowest level (3a') of the adjacent portion of the upper surface (3a) of the platform unit (3),
wherein the supporting member (17, 27) is connected to the storing device via a pivot (19, 26), the pivot being located below the level (21a') of the lower surface (21b) of the element (21) forming the at least one of i) an entry area (9) and ii) an exit area (10).

14. The rotary parlour of claim 13, wherein,
the supporting member (17, 27) is mounted to the lower surface of the platform unit by a fixed connection (18, 28) at the lower surface (3b) of the platform unit (3).

15. The rotary parlour of claim 13, wherein,
the whole support element (17, 27) is mounted in a position below the lowest level (3a') of the upper surface (3a) of the platform unit (3).

16. The rotary parlour of claim 13, wherein,
the supporting member (17, 27) is mounted to the lower surface of the platform unit.

17. A rotary parlour for milking of animals (1), comprising:
a rotary platform unit (3) having i) an upper surface (3a) adapted to support animals (1) to be milked on the platform unit, and ii) a lower surface (3b) forming an underside of the platform unit;
at least one storing device (11, 24, 25) for parking of teat cups (2) in predetermined parking positions;
a supporting member (17, 27) located below the lower surface of the platform unit and supporting the storing device; and
an elevating part (20, 22, 30) arranged to move the storing device between an operating position and a non-operating position,
in the operating position, the storing device holding at least a part of the teat cups at a higher level than a lowest level (3a') of an adjacent portion of the upper surface (3a) of the platform unit, in the non-operative position, the storing device storing the teat cups at a lower level than the lowest level (3*a*') of the adjacent portion of the upper surface (3*a*) of the platform unit (3), in the non-operative position, the storing device being located below the lowest level (3*a*') of the adjacent portion of the upper surface (3*a*) of the platform unit (3), wherein, the supporting member (17, 27) is connected to the storing device via a pivot (19, 26), the storing device comprises a removing device (15) connected one of the teat cups, the removing device is arranged to provide a pulling force on the one teat cup when a milking operation has been finished, the pulling force sufficient to i) remove the one teat cup from a teat of the animal being milked, and ii) retract the one teat cup to one of the the parking positions in the storing device, the supporting member comprises a first end mounted to the lower surface of the platform unit and a second end pivotable supporting the storing device at the pivot, and in the operative position and in the non-operative position, the whole supporting member is located below the lowest level (3*a*') of the adjacent portion of the upper surface (3*a*) of the platform unit (3).

18. The rotary parlour of claim 17, wherein, the storing device is pivoted, at the pivot, to the supporting member at a distance above a center of mass of the storing device, the storing device further comprises a roller member (20), and the elevating part comprises a ramp (22) radially outside of the platform unit, the ramp positioned such that the rolling member (20) of the storing device comes in contact with an upper guide surface of the ramp during rotation of the platform unit, and the ramp comprises a first portion with an upwardly inclined guide surface (22*a*), a second portion with a plane guide surface (22*b*), and a third portion with a downwardly inclined guide surface (22*c*).

19. The rotary parlour of claim 17, wherein, the elevating part comprises an actuator connected to the supporting element and to the storing device, and when activated, the actuator turns the storing device around the pivot to the operating position.

* * * * *